United States Patent Office 2,815,261
Patented Dec. 3, 1957

2,815,261

URANIUM PRECIPITATION PROCESS

Arvid Thunaes, Ernest Arthur Brown, Harold William Smith, and Roger Simard, Ottawa, Ontario, Canada, assignors to the United States of America as represented by the United States Atomic Energy Commission No Drawing. Application May 1, 1951,
Serial No. 224,062

9 Claims. (Cl. 23—14.5)

This process relates to the recovery of uranium from sulphuric acid solution containing uranium.

Precipitation of uranium from dilute solutions produced in leaching uranium ores with weak sulphuric acid is known to have been carried out previously by neutralization to pH 5 to 6 of the acid solution with lime, limestone, magnesia or caustic without reduction. The disadvantage of this method is that with complex solutions the method is not selective and a low grade precipitate is obtained due to precipitation with the uranium of other elements such as ferric iron and aluminium. Even when ferric iron in the solution is kept to a minimum, ferrous iron will precipitate at the high pH required for complete recovery of the uranium. Uranium has also been precipitated from such solutions by the addition of phosphate without reduction of the uranium. Again the method is not sufficiently selective and a low grade precipitate is obtained.

Another process which has been used is the reduction of weak sulphuric acid leach solutions with metallic iron. Ferric iron is reduced to ferrous iron, hexavalent uranium is reduced to tetravalent uranium and on addition of phosphate tetravalent uranium is selectively precipitated at low pH values.

In the present process sulphuric acid is added to the uranium bearing solution to bring the pH to between 1 and 1.8, preferably to about 1.4, and aluminium metal is used as a reducing agent. As the reaction proceeds the pH rises and a selective precipitation of uranium occurs resulting in a high grade precipitate. This process is an improvement over the process using metallic iron in that there is a weight advantage to using aluminium in place of iron and in addition metallic aluminium reacts less readily than metallic iron with sulphuric acid, thus avoiding consumption of the reducing agent and a raising of the pH without accomplishing the desired reduction of the hexavalent uranium in the pregnant solution. Another disadvantage to the use of iron is that positive ferric ions will precipitate with negative phosphate and arsenate ions at the pH range employed.

The process will now be considered in greater detail. Solutions produced by leaching uranium ore with dilute sulphuric acid according to a process such as is described in copending application Serial No. 224,063, filed May 1, 1951, now abandoned, in which the uranium is present in the hexavalent form are adjusted by the addition of sulphuric acid to a pH of between 1 and 1.8 and with a typical ore preferably to 1.4. The optimum pH will depend on the nature of the impurities in the leach solution. Metallic aluminium in a suitable form such as powder is added in a sufficient quantity to reduce hexavalent uranium in the solution to the tetravalent stage and also to reduce any residual oxidizing agent or other substances in the solution capable of reduction. The precise amount of aluminium powder which should be added will vary with the solution treated and must be calculated from an analysis of the leach solution showing the quantity of hexavalent uranium, residual oxidizing agent and other substances capable of reduction. A typical quantity is specified in Example 1 below. The solution is agitated with the metallic aluminium for as long as is necessary to give substantially complete reduction. If aluminium is used in powder form about 24 hours should be adequate. The solution may be sampled to verify that it is sufficiently barren. Agitation is stopped and the solution is settled. The clear liquor may then be decanted and the precipitate dewatered by filtration and dried.

Alternatively, the reduction may be carried out by running the pregnant leach solution through a bed or column of aluminium metal particles instead of agitating the solution with aluminium powder. Dimensions of the bed or column and the rate at which the solution is fed into such bed or column are chosen so that the effluent is sufficiently barren of uranium, the value of increased yield being balanced aganst the cost of additional treatment. When the column or bed has become loaded with precipitate it is backwashed with water to remove the precipitate which is separated from the water by filtration and then dried or a backwash of dilute sulphuric acid may be used instead of water to remove the precipitate. The column or bed may be used repeatedly; aluminium metal being replenished as required.

Instead of aluminium, elemental arsenic may be used as a reducing agent. This reagent has the advantage that it will also act as a precipitating agent through the formation of arsenate ion.

During the agitation or passage through the bed or column the pH of the solution will rise as a consequence of the reduction reaction. As the pH rises uranium will be precipitated as uranous phosphate, arsenate or fluoride by impurities present in complex leach solutions capable of precipitating tetravalent uranium at low pH values. When the solution does not contain sufficient impurities to precipitate all of the uranium, arsenate may be added to supply the deficiency. Precipitation will be substantially complete at a pH of below 2.

As an alternative preliminary step in the reduction, the uranium bearing solution may be treated with sulphur dioxide before it is brought in contact with the aluminium to reduce residual oxidizing agents such as for example ferric iron and sodium chlorate. The sulphur dioxide may be used in the form of burner or roaster gas and the cost is therefore slight. The use of sulphur dioxide results in a lowering of pH which means that less sulphuric acid is subsequently required to adjust the pH to within the desired limit; also a saving in the aluminium metal necessary for the reduction step is effected.

Example 1 illustrates treatment with aluminium powder alone.

EXAMPLE 2

A batch of leach solution 320 litres in volume containing per litre 1.41 grams $U_3O_8$, 2.5 grams ferric iron, 0.23 gram sodium chlorate, 0.18 gram $P_2O_5$ and 0.79 gram arsenic and having a pH of 1.6 was acidified to pH 1.3 by the addition of 4 grams of sulphuric acid (100%) per litre. Aluminium metal powder was then added 1.35 grams per litre and the solution was agitated for 26 hours by gentle stirring sufficient to keep the aluminium powder dispersed. At the end of this period the pH had risen to 1.65. The precipitate was filtered and dried. The dried precipitate weighed 945 grams and assayed 45.7% $U_3O_8$, 12.8% As and 5.0% $P_2O_5$ and the recovery of uranium in the precipitate was 95.6% of the uranium in the original leach solution. The barren solution assayed 0.06 gram $U_3O_8$ per litre.

In terms of the original quantity of ore from which the leach solution treated was produced, the reagent consumption in precipitation was 3.45 pounds of aluminium metal and 10.2 pounds of sulphuric acid (100%) per ton of ore.

Example 2 shows the partial reduction of oxidizing agents in the leach solution using sulphur dioxide.

EXAMPLE 2

A batch of leach solution 375 litres in volume containing 1.21 grams of sodium chlorate per litre and having a pH of 1.7 was treated for four hours by gassing with sulphur dioxide in the form of burner gas containing 15% sulphur dioxide by volume. The amount of sulphur dioxide passed in to the solution was the amount theoretically necessary to reduce the sodium chlorate present. The amount of chlorate actually reduced was 87.5% of the total, leaving a solution of pH 1.4 containing per litre 1.25 grams $U_3O_8$, 2.3 grams ferric iron, 0.15 gram sodium chlorate, 0.92 gram As and 0.50 gram $P_2O_5$. This solution was treated with 1.0 gram aluminium metal per litre using gentle agitation to keep the aluminium dispersed. No sulphuric acid was added in this case and the agitation was stopped after 24 hours, by which time the pH had risen to 1.8. The precipitate was settled and separated from the solution by filtration and dried. The dry precipitate weighed 1048 grams and assayed 43.65% $U_3O_8$, 8.8% As, 10.4% $P_2O_5$. 97.6% of the total uranium contained in the original solution was recovered in this high grade precipitate. The barren solution assayed 0.026 gram $U_3O_8$ per litre.

In terms of the original quantity of ore from which the leach solution so treated was produced, the reagent consumption in precipitation was 2.84 pounds of aluminium metal and 6.4 pounds of sulphur dioxide per ton of ore.

Table 1 shows the assay of a dried sample of a composite of precipitates produced in pilot plant leaching of a complex ore.

Table 1

| | Percent |
|---|---|
| $U_3O_8$ | 45.41 |
| Cu | 1.3 |
| As | 10.76 |
| P | 2.39 |
| Fe | 0.79 |
| Ca | 0.04 |
| Si | 0.4 |
| Al | 5.3 |
| Rare earths | 0.05 |
| $H_2O$ | 1.62 |
| Residue | 31.94 |
| | 100.00 |

We claim:

1. A process for the recovery of uranium from sulphuric acid solutions containing hexavalent uranium and oxidizing agents in which the solution is treated with sulphur dioxide to effect a partial reduction of the oxidizing agents and to lower the pH of the solution, and in which the pH of the solution is then adjusted to between 1 and 1.8 and the solution is brought in contact with a sufficient quantity of a reducing agent comprising elemental arsenic, substantially to complete the reduction of oxidizing agents in the solution and of hexavalent uranium to tetravalent uranium.

2. A process for the recovery of uranium from sulphuric acid solutions containing hexavalent uranium and oxidizing agents in which the solution is treated with sulphur dioxide to effect a partial reduction of the oxidizing agents and to lower the pH of the solution, and in which the pH of the solution is then adjusted to between 1 and 1.8 and the solution is brought in contact with a sufficient quantity of a reducing agent comprising aluminium metal substantially to complete the reduction of oxidizing agents in the solution and of hexavalent uranium to tetravalent uranium and in which said uranium is selectively precipitated by an agent selected from the group consisting of arsenates, phosphates and mixtures thereof.

3. A process for the recovery of uranium from sulphuric acid solutions containing hexavalent uranium, oxidizing agents and impurities selected from the group consisting of arsenates, phosphates and mixtures thereof in which the pH of the solution is adjusted to between 1 and 1.8 and the solution is brought in contact with a sufficient quantity of a reducing agent comprising elemental arsenic, to reduce hexavalent uranium to tetravalent uranium and to reduce the oxidizing agents in the solution and in which the tetravalent uranium is selectively precipitated by said impurities and separated from the solution.

4. A process for the recovery of uranium from sulphuric acid solutions containing hexavalent uranium, oxidizing agents and impurities selected from the group consisting of arsenates, phosphates and mixtures thereof in which the pH of the solution is adjusted to between 1 and 1.8 and the solution is brought in contact with a sufficient quantity of a reducing agent selected from the group consisting of arsenic, aluminium and mixtures thereof to reduce hexavalent uranium to tetravalent uranium and to reduce the oxidizing agents in the solution and in which the tetravalent uranium is selectively precipitated by said impurities and separated from the solution.

5. A process as in claim 4 in which aluminium metal is used as reducing agent.

6. A process for the recovery of uranium from sulphuric acid solutions containing hexavalent uranium, oxidizing agents and insufficient impurities to precipitate tetravalent uranium at low pH values in which the pH of the solution is adjusted to between 1 and 1.8 and the solution is brought in contact with a sufficient quantity of a reducing agent selected from the group consisting of arsenic, aluminium and mixtures thereof, to reduce hexavalent uranium to tetravalent uranium and to reduce the oxidizing agents in the solution, and in which a substance selected from the group consisting of arsenates, phosphates and mixtures thereof is added selectively to precipitate the uranium.

7. A process for the recovery of uranium from sulphuric acid solutions containing hexavalent uranium, oxidizing agents and insufficient impurities to precipitate tetravalent uranium at low pH values in which the pH of the solution is adjusted to between 1 and 1.8 and the solution is brought in contact with a sufficient quantity of a reducing agent comprising elemental arsenic, to reduce hexavalent uranium to tetravalent uranium and to reduce the oxidizing agents in the solution, and in which a substance selected from the group consisting of arsenates, phosphates and mixtures thereof is added selectively to precipitate the uranium.

8. A process as in claim 6 in which aluminium metal is used as reducing agent.

9. A process as in claim 5 in which the pH of the solution is adjusted to 1.4.

References Cited in the file of this patent

UNITED STATES PATENTS 890,584    Fleck et al. _____ June 9, 1908